1,914,067

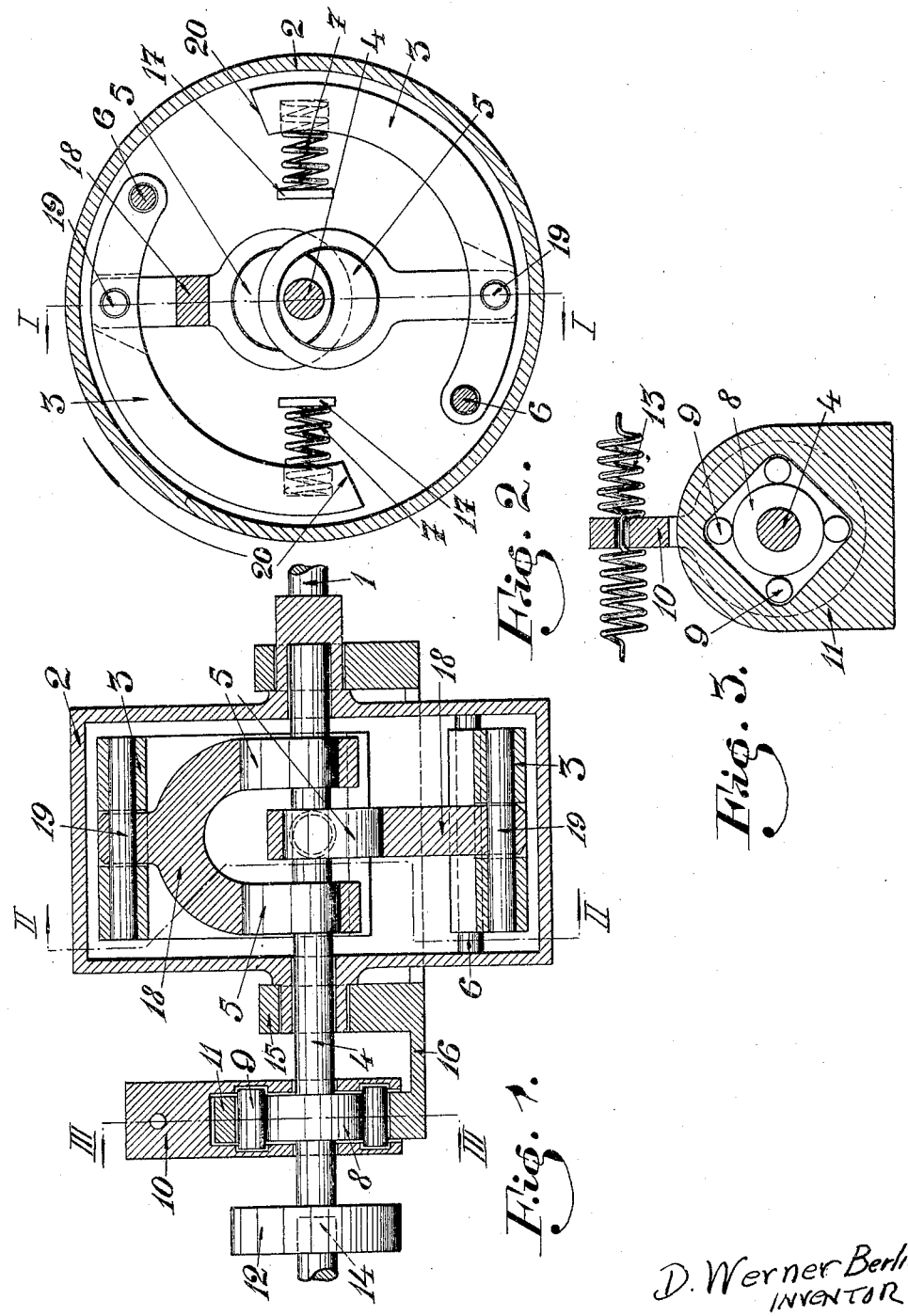
June 13, 1933.  D. W. BERLIN  1,914,067
AUTOMATICALLY VARIABLE CHANGE SPEED GEAR DEVICE
Filed April 8, 1931
D. Werner Berlin
INVENTOR Patented June 13, 1933

UNITED STATES PATENT OFFICE

DAVID WERNER BERLIN, OF RASUNDA, SWEDEN

AUTOMATICALLY VARIABLE CHANGE SPEED GEAR DEVICE

Application filed April 8, 1931, Serial No. 528,667, and in Sweden March 4, 1931.

The present invention relates to an automatically variable change speed gear device for automatically transforming a torque with great speed of revolutions and little moment of torsion into a torque with less speed of revolutions but greater moment of torsion. Said device will act under all gearing conditions, all from the torque of the driven shaft being as great as that of the driving shaft, when the gear ratio is 1:1, to the torque of the driven shaft being so great that the latter is practically motionless, when the gear ratio is approximately 1: infinity. The transmission of power from the driving or primary shaft to the driven or secondary shaft is effected partly by direct coupling up to a certain moment of torsion and partly by co-operation of the driving force of the primary shaft, the centrifugal force and the vis viva of the masses and weights in the gear device. The invention is characterized by centrifugal and flying masses fixed or pivoted on the primary shaft and rotating round and with the latter in one direction, said centrifugal masses being attached in the form of centrifugal weights to the flying masses in such a drawing and rotating manner that when the secondary moment of torsion is greater than the primary one the centrifugal weights exert a rotating action on the secondary shaft during one half revolution and by the aid of the secondary shaft exert a drawing and rotating action on the flying masses of the primary shaft during the other half revolution, thereby increasing the vis viva of said flying masses which vis viva during the next half revolution is again utilized for the purpose of rotating the secondary shaft indirectly by means of the centrifugal weights.

In order that the primary shaft within certain limits may be able to rotate the secondary shaft directly in both directions without the centrifugal and flying masses taking part the centrifugal masses are directly or indirectly spring-loaded in the direction of the centrifugal force, so that a rotating action is effected on the secondary shaft by means of the spring force. Owing to the spring action the centrifugal weights may be so much smaller, that the centrifugal force is reduced by the amount of the spring force, whereby lighter constructions are attained. The spring load on the centrifugal weights also has the effect, that the secondary shaft can rotate the primary shaft with the moment of torsion corresponding to the tension of the springs, which is of very great importance for instance when the gear device is mounted in automobiles and other vehicles. Then in such a case the motor can remain engaged and act as a brake when driving down slopes. In order that the primary shaft and the gear device may be able to rotate the secondary shaft in one direction regardless of whether the moment of torsion of the secondary shaft is greater or less than that of the primary shaft, the secondary shaft is by means of a check device prevented from rotating in the opposite direction. Owing to the fact that the check device can be made operative in one or in the opposite direction the secondary shaft may be brought to rotate in the desired direction by reversing the check device. For the purpose of smoothing the power transmission of the secondary shaft when the moment of torsion of the latter is greater than that of the primary shaft the secondary shaft is cut off behind the check device, the parts being connected by a spring drive, which accumulates torque and smoothes the output, so that the rotation is made uniform.

The reversal of the direction of rotation of the secondary shaft is preferably effected by spring loading the check members in one or in the opposite direction.

The invention is diagrammatically illustrated, by way of example, in the accompanying drawing, in which:

Fig. 1 is a longitudinal section, showing one form of construction,

Fig. 2 is a cross section through 2—2 in Fig. 1 and

Fig. 3 is a cross section through 3—3 in Fig. 1.

In the change speed gear device illustrated in Figs. 1 and 2 the arrangement of the different parts and the co-operation therebetween are such, that the flying masses 2 (casing) fixed to the primary shaft and the centrifugal masses 3 pivoted to the casing 2 rotate in one direction with or round the secondary shaft 4 when motion is to be transmitted to this shaft, which is provided with eccentrics or cranks 5 carrying the centrifugal masses 3 and actuated by these, so that the secondary shaft is driven in the direction of rotation or in the opposite direction. The centrifugal masses are at 6 pivoted to the flying masses 2 and by means of the springs 7 spring-loaded in the direction of the centrifugal force. The check device on the secondary shaft 4, shown in Figs. 1 and 3, consists of the roller 8 fixed to the secondary shaft 4 and surrounded by a number of check members 9, which are spring-loaded by means of the spring 13 and controlled by the member 10, so that they in one direction press against the inner surfaces of the casing 11, whereby the roller 8 is prevented from rotating in this direction.

The secondary shaft 4 is cut off at 14 and the parts are connected together by a spring drive 12. The change speed mechanism is mounted in bearings 15 supported by a base plate 16. The springs 7 are compressed between the movable centrifugal weights 3 and the members 17 projecting from the casing 2.

The principally new feature of the invention consists in the centrifugal weights 3 being pivoted to the casing 2 at 6 with one end, the fore-end, and pivotally connected with the eccentrics or cranks 5 of the secondary shaft 4 through arms 18 pivoted at a point 19 which is so situated, that the weight of the part from 19 to 20 of the centrifugal body is considerably greater than that of the part from 19 to 6, for the purpose that when during the negative half revolution the centrifugal weights 3 are moving towards the periphery their centrifugal force and, possibly, the spring force shall be transmitted through the point 6 and by the aid of the secondary shaft to the casing 2 as a force acting in the direction of rotation and increasing the vis viva of the body 2, said vis viva being again transmitted as torque to the secondary shaft 4 during the next half revolution through the centrifugal weights 3, the arms 18 and the eccentrics 5, thereby enabling the power produced during the negative half revolution to be completely utilized. Another feature of the invention is that the centrifugal weights 3 are spring-loaded at the free end, so that without regard to the speed of revolutions the secondary shaft always obtains a certain moment of torsion, owing to the spring tension, which through the weights 3 and the arms 18 is transmitted to the eccentrics 5 and from these to the secondary shaft 4, whereby for instance a motor car provided with this change speed mechanism will always be in connection with the motor.

A further feature of the invention is that the direction of rotation of the secondary shaft 4 may be reversed without the necessity of overcoming the force of any flying masses, and finally that unevenness of the moment of torsion of the secondary shaft 4 is smoothed by a spring drive accumulating the peak load.

Having now described my invention, what I claim as new and desire to secure by Letters Patent is:

1. Automatically variable power transmission device, comprising a primary shaft and a secondary shaft, eccentrics fixed to the secondary shaft, a flying mass fixed to the primary shaft and rotatable about the secondary shaft, centrifugal masses pivotally connected at one of their ends with the flying mass, arms having their inner ends connected with the eccentrics and their outer ends pivotally connected with the centrifugal masses, the pivotal connection between the arms and centrifugal masses being disposed at a point remote from the free ends of the centrifugal masses and adjacent to the pivotal connection between the centrifugal masses and flying mass, and compression springs between the free ends of the centrifugal masses and disposed in a plane with the secondary mass.

2. Device according to claim 1 characterized in that the centrifugal masses are subjected to the action of the springs at their ends in the direction of the centrifugal force, whereby the primary shaft, when rotating at a lower or higher rate is capable of rotating the secondary shaft with a certain rotary moment, without the centrifugal and swinging masses partaking thereof, and vice versa.

3. Device according to claim 1 characterized in that the secondary shaft is connected with a resilient coupling, which equalizes the rotary movement when the secondary torque is greater than that of the primary.

4. Device according to claim 1, characterized in that there is provided a double acting check apparatus including a control member which is subjected to spring action opposite to the direction of rotation, when the rotational direction is reversed.

In witness whereof I have hereunto signed my name.

DAVID WERNER BERLIN.